Dec. 26, 1922.
A. FEIGELSON.
TRAILER.
FILED FEB. 10, 1921.
1,439,880.
3 SHEETS—SHEET 3.
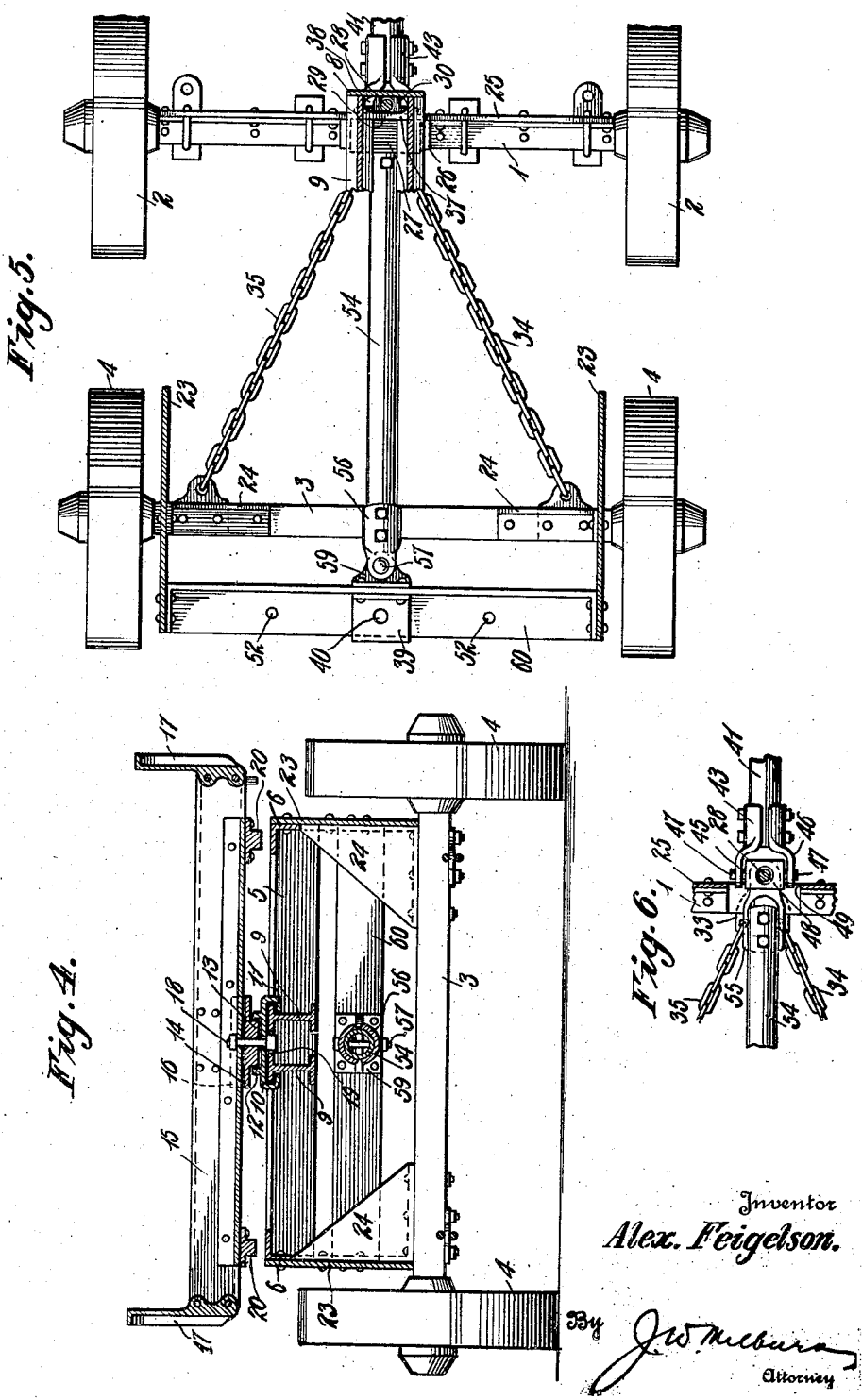
Inventor
Alex. Feigelson.

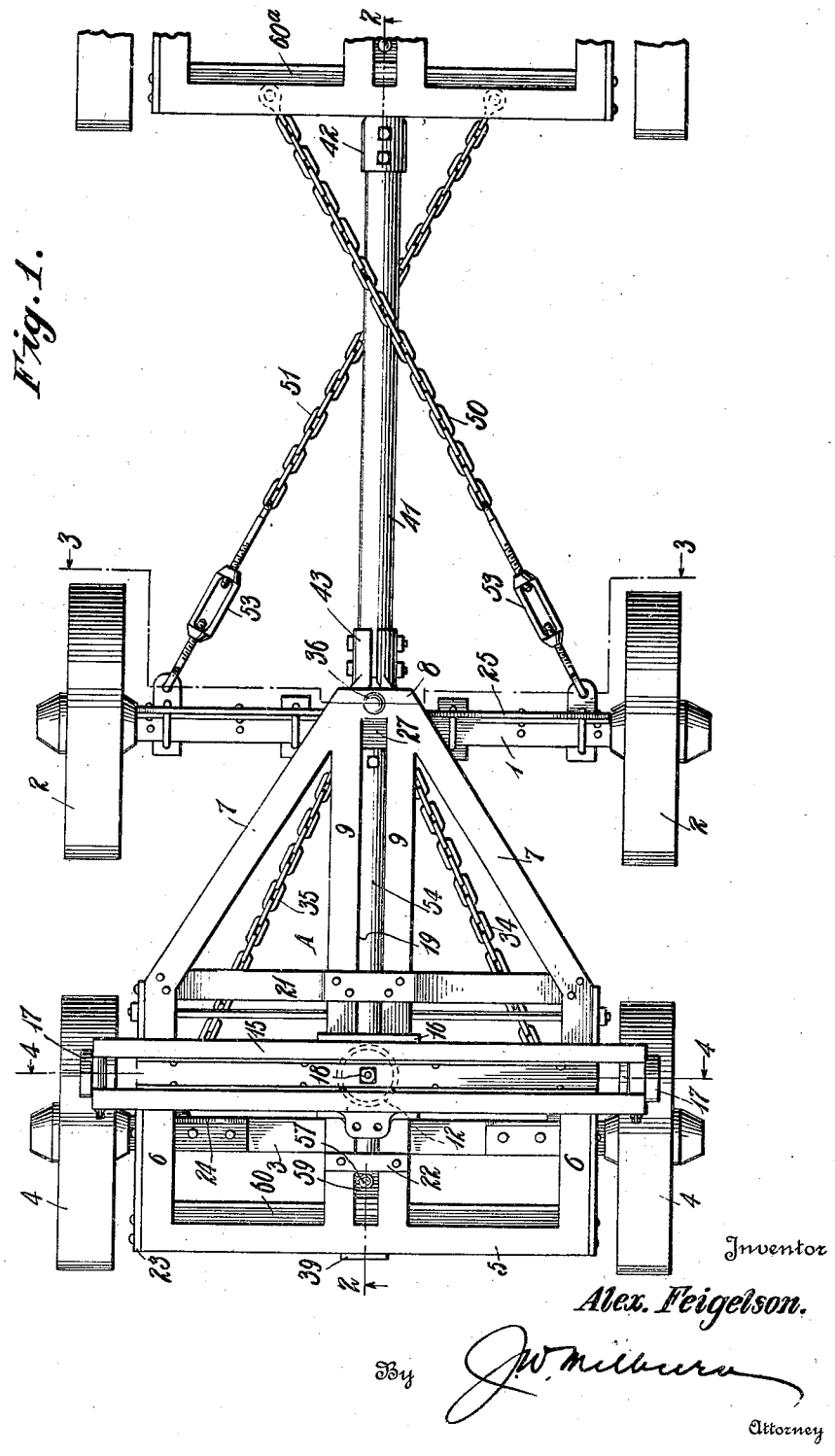

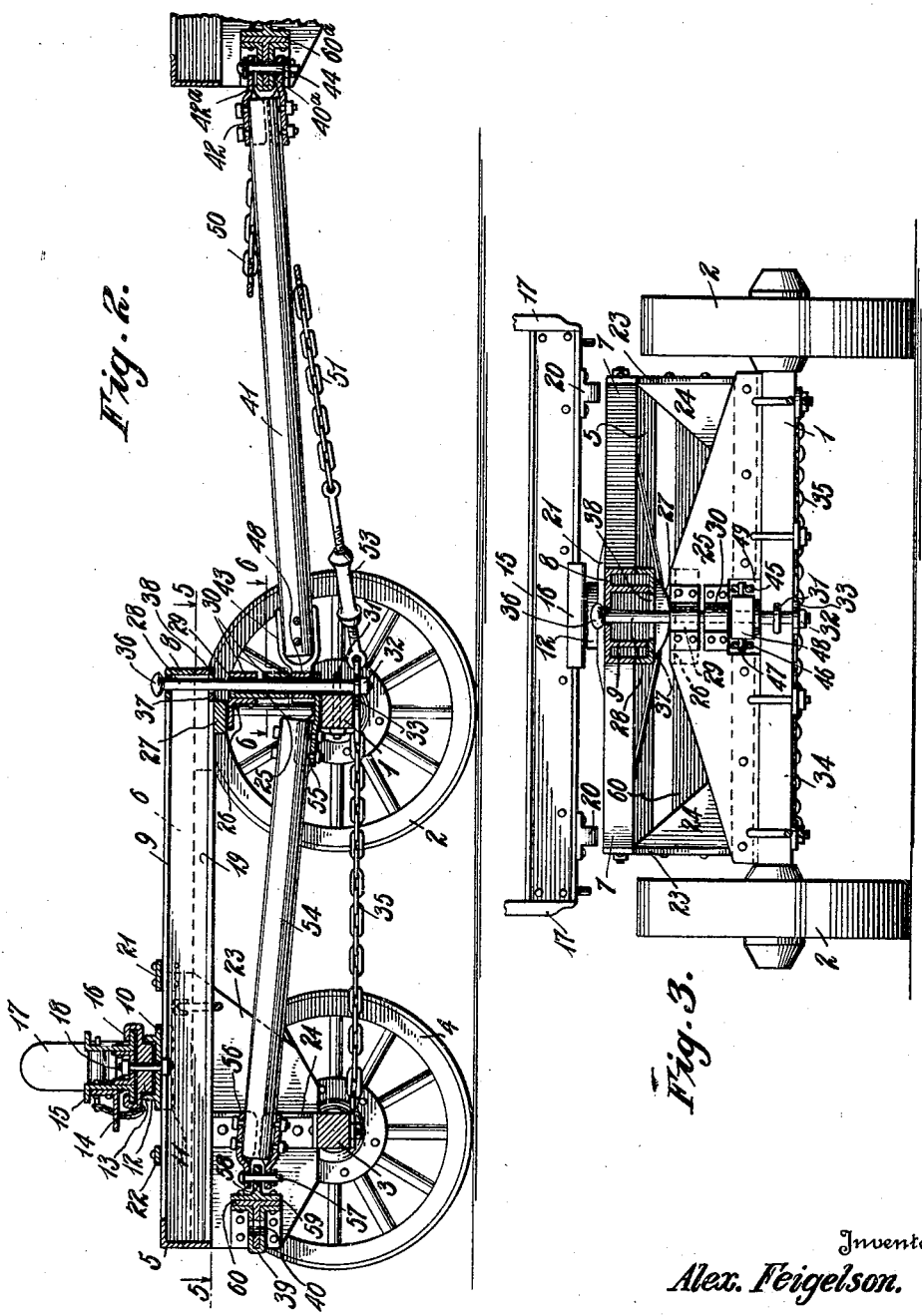

Patented Dec. 26, 1922.

1,439,880

UNITED STATES PATENT OFFICE.

ALEXANDER FEIGELSON, OF BEAUMONT, TEXAS.

TRAILER.

Application filed February 10, 1921. Serial No. 443,872.

*To all whom it may concern:*

Be it known that I, ALEXANDER FEIGELSON, a citizen of the United States, residing at Beaumont, in the county of Jefferson and State of Texas, have invented a new and useful Trailer, of which the following is a specification.

My invention relates to trailers for use with trucks or tractors and resides in certain features of construction whereby a continuous jointed draft-pole through the longitudinal extent of the trailer is provided, whereby the trailer wheels are enabled and caused to trail in the tracks of the preceding truck or trailer; whereby unusual flexibility of the trailer is obtained, without decreasing its strength; and whereby the tilting or straining of the load and load-supporting frame, due to the passing of the wheels over uneven surfaces, will be eliminated or reduced to a minimum.

In the drawings, wherein like reference numerals designate the same parts throughout the several views, Fig. 1 is a plan view of the trailer;

Fig. 2 is a central longitudinal section of the trailer, taken on line 2—2 of Fig. 1;

Fig. 3 is a front elevational view, partly in section, on line 3—3 of Fig. 1;

Fig. 4 is a transverse section on line 4—4 of Fig. 1;

Fig. 5 is a plan view, partly in section, on line 5—5 of Fig. 2; and

Fig. 6 is a similar view, taken on line 6—6, of Fig. 2.

In my improved trailer, a load-carrying frame A is supported upon a front axle 1, carrying wheels 2, and a rear axle 3, carrying wheels 4. The frame is composed of an end member 5, side members 6, front members 7, and a head block 8, riveted, welded or otherwise rigidly connected together, and preferably of angle-iron construction. The front members 7 converge toward the front, and together with the head-block 8 give to the forward part of the frame a truncated V-shape.

This structure is advantageous in that the converging of the frame toward the front enables the front and rear wheels to be placed close together and insures clearance of the front wheels when the latter are turned, permitting an exceptionally short turn to be made without difficulty.

Extending longitudinally through the center of the frame are a pair of parallel spaced I-beams 9, rigidly secured to the frame at front and rear and providing a guiding and retaining support for a bolster-saddle 10, slidably mounted thereupon, the saddle having inturned ends 11, extending under the top outer side flanges of the I-beams 9. The upper surface of the saddle 10 has an upwardly projecting ring 12, forming a pivotal seat for a correspondingly shaped projection 13, on the under side of a plate 14, upon which a bolster 15 is supported between the inturned upper portions 16 of the plate. The bolster 15 is provided with side standards 17, and the bolster and its supporting plate 14 are pivotally secured to saddle 10 by means of a pivot bolt 18, which passes through slot 19 between I-beams 9.

The bolster is thus capable of pivotal movement about the bolt 18 in the seat 12 and longitudinal adjustment on the frame A by the sliding of the saddle 10 on I-beams 9. By this construction, the load will lie firm and level in the bolsters when a turn is made, and the variation in length between centers will be remedied by the sliding of the bolsters. The tilting movement of the bolster is restricted and excessive tilting prevented by one or the other of the shoes 20, fixed to the under side of the bolster, engaging the upper surface of the side member 6 beneath it. The longitudinal movement of the bolster is limited by truss-bar 21 and strip 22, respectively positioned forward and rearward of the bolster and secured to the top of the I-beams 9. Bar 21 has its ends fastened to the under side of the opposite side members 6 and serves to brace the side members and increase the lateral rigidity of the frame.

To support the frame A upon the rear axle there is rigidly attached to each side member 6 of the frame a depending plate 23 which rests upon the rear axle 3 and is rigidly secured thereto by a brace plate 24. Plates 23 are further held and braced in vertical position by an angle bar 60, to the vertical flange of which is secured a centrally positioned plate 59, provided with an eye 58 for a purpose hereinafter explained. On the horizontal flange of bar 60 there is fastened a bearing strap 39, overlying both the upper and lower surfaces of the bar. A vertical opening 40 is formed through the bar and bearing plate for the reception of coupling means for attaching the draw bar of a succeeding trailer.

The manner of supporting the frame A on the front axle is such as to permit of a pivotal swinging of the axle in a horizontal plane or tilting in a vertical plane, or both, without materially affecting the normal position of the frame or subjecting it to undue tilting or twisting strains. The base upon which the front end of the frame is carried consists of an axle bed 25, carried by and rigidly secured to the front axle and having firmly fastened to its upper end a horizontal plate 26 which forms a part of a rocking fifth wheel and acts as a rocking seat for the frame. Upon the upper surface of this seat rests a rounded bearing block 27, affixed to the under side of the head block 8 of frame A. In use, the block 27 is designed to have a rocking movement on its supporting seat 26 under certain conditions, this rocking movement greatly increasing the lateral flexibility of the trailer.

The frame A is pivotally connected to the front axle by means of a king bolt 28, passing through the head block and journaled on the axle bed, preferably in bearings 29 provided therefor by strap-irons 30, and held to the axle by U-bolt 31. To the lower end of the king bolt there is secured, by a nut 32, or other suitable means, a plate 33, to which chains 34 and 35 are attached, as clearly shown in Fig. 6. These chains are attached at their rear ends in somewhat slack condition to the rear axle at or near its ends. They not only serve as a supporting element for the front axle but also tend to hold and brace the king bolt and front axle structure against extreme side motion and prevent undue strain thereon and assist in steering by effecting proper turning of the rear axle when the front axle is turned, to accomplish tracking of the wheels with those of the preceding vehicle.

To permit lateral play of the king bolt, swinging from its head 36 on the upper face of the head block 8, the aperture in the lower flange portion 37 of the head block, provided for the passage of the king bolt, is made in the form of a relatively wide lateral slot 38. The opening in the top of the head block is slightly wider than the shank of the king bolt to permit the swinging of the bolt on its head. With this construction, whenever either of the front wheels encounters an obstacle or uneven place on the ground, the axle is tilted to one side or the other, but instead of the frame A being tilted with the axle or subjected to severe lateral strains, the axle, hung on king bolt 28, swings about the curved bearing block 27 on a pivot point consisting of the head 36 of the king bolt. Considerable lateral tilting of the front wheels and axle may thus take place, independent of the frame A and without being communicated thereto.

The draft means for the trailer comprises a draft pole 41, connected to the forward end of the trailer by a universal joint and also adapted to be pivotally connected to the rear end of the preceding vehicle. The pole has a collar (42, 43) secured to each end, which may or may not be split, as desired. Collar 42, on its forward end, has a terminal clevis 42$^a$ and pin 44, passed through the perforations in the clevis and the registering opening 40$^a$ in the bar 60$^a$, pivotally connects the draft pole with the preceding vehicle so as to be capable of a wide horizontal swinging movement. Collar 43 on the rearward end of the pole is also in the form of a clevis, the arms 45, 46 of which are journaled on pins or studs 47, projecting from opposite ends of a horizontal block 48. This block has a vertical opening through its center, through which passes the king bolt 28. The block is preferably arranged just above the axle 1 and set in an aperture 49 in the axle bed 25. The upper edge of the aperture limits upward movement of the block on the king bolt and thus retains the point of draft connection at substantially uniform level, while permitting free horizontal pivotal movement of the block about the king bolt and free vertical pivotal movement of the yoke 45—46 about the pivot formed by pins 47.

In order to cause the wheels of the trailer to trail in the tracks of the preceding truck, tractor, or trailer to which it is connected, chains or hinged rods 50, 51 are fastened to the front axle near its ends and attached at their opposite ends, in crossed relation, to the rear of the preceding vehicle, preferably to bar 60$^a$. For convenience in attaching the chains, apertures similar to apertures 52 in bar 60 may be utilized in the manner shown in Figs. 1 and 5, but any other suitable or convenient attaching means may be employed. To insure free sliding of the chains over one another at their point of crossing, the chains are spaced apart and made to ride against the smooth draft pole, one of the chains being crossed over and the other under the pole, as shown in Fig. 1. The chains are adapted to steer the front wheels of the trailer and cause them to trail in the tracks of the vehicle ahead. This result will be best accomplished if the chains are in taut or substantially taut condition. The degree of tautness or slack may be varied at will by means of turnbuckles 53, which also permit the chains to be disconnected readily and without interfering with the attaching means on either vehicle, whenever the vehicles are disconnected or it is desired to use the trailer without the chains in place.

In the trailer construction thus far described, the front axle and king bolt, unless braced in some way, would, under the pull of the draft pole, tend to be drawn out of their proper and necessary perpendicular alinement. To guard against such a condition, the trailer is provided with a longitudinal brace member which insures longitudinal rigidity of the trailer without interference to the slightest degree with its lateral and vertical flexibility. This brace member, in the preferred form illustrated in the drawing, consists of a reach rod 54, with its forward end in substantially the same horizontal plane as the draft pole, and, like the latter fastened to the front of the trailer by having the king bolt passed through it. As a convenient coupling means for the forward end of the reach rod, the latter may have its end portion resting upon and secured to a plate 55, which in turn is supported by the front axle. The king bolt passes through this plate and thus holds the reach rod in alinement with the draft pole, at the same time providing a pivotal connection for both the draft pole and the reach rod. The provision of the flat coupling plate 55 and the spacing of the end of the reach rod from the rearward face of the axle bed insures free and unrestricted swinging of the reach rod and the axle construction about the pivotal connection.

To further increase the flexibility of this construction the reach rod is provided at its rearward end with a clevis construction similar to that on the forward end of draft pole 41, the collar 56 being pivotally connected to the cross bar 60 of the trailer frame by means of a pin 57, through eye 58 in plate 59, fixed to rear bar 60. It will be noted that the reach rod has a flexible connection at each end. It will be further noted that the reach rod is attached at its forward end at the point of connection of the draft pole and at its rearward end at the point of connection of the draft pole of the succeeding vehicle. By this arrangement, a continuous draft is secured and a draft means equivalent to one continuous jointed draft pole if formed by the draft pole and reach rod of a single trailer or through the draft poles and reach rods of any number of connected trailers of like construction.

What I claim is:

1. A trailer comprising front and rear axles, a frame mounted on the rear axle, means for supporting the frame on the front axle to permit rocking movement between said front axle and said frame, and a reach rod flexibly connected to the front axle and flexibly connected to the under part of the frame near its rear end.

2. A trailer comprising front and rear axles, a frame mounted thereon, said frame including a transverse brace member above the rear axle, a rocking connection between the front axle and the frame and a reach rod flexibly connected at its forward end to the trailer near the front axle and flexibly connected at its rearward end to said brace member.

3. A trailer comprising front and rear axles, a frame mounted thereon, said frame including a transverse brace bar above the rear axle, means for permitting a rocking movement between the front axle and the frame, a reach rod, means for flexibly connecting the forward end of said reach rod to the trailer at the front axle, said reach rod extending rearwardly and upwardly, and means for connecting the rearward end of said rod to said brace bar.

4. A trailer comprising front and rear axles, a load-carrying frame having depending supporting members on each side secured to the rear axle and a transverse brace bar connecting said supporting members above and rearward of the rear axle, and a reach rod flexibly connected at its forward end to the trailer near the front axle and flexibly connected at its rearward end to said brace bar.

5. A trailer comprising front and rear axles, a frame mounted thereon, a reach rod flexibly connected at its rear end to the under part of the frame near its rear end, a rearwardly extending plate resting on said front axle, the front end of said reach rod being supported by said plate, and a king bolt connecting the frame to the front axle and passing through the forward part of said plate.

6. A trailer comprising front and rear axles, a frame mounted thereon, an axle bed on the front axle, said axle bed being provided with a central aperture, a draft pole, a reach rod, means for hingedly connecting said rod to the under side of the frame near its rear end, a coupling member on said draft pole extending into said axle bed aperture, a substantially horizontal plate resting on said front axle and extending into said aperture, the front end of said reach rod being attached to and supported by said plate, and a king bolt pivotally connecting the frame and front axle and hingedly connecting the draft pole coupling and the reach rod supporting plate.

7. A trailer comprising front and rear axles, a frame mounted on the rear axle and having a head block, means for supporting the frame on the front axle, said means comprising a transverse, vertically-disposed axle bed, a bracket secured to the upper end of said axle bed and adapted to form a rocking seat for the front part of the frame, a bearing block secured to the frame and adapted to rest upon said bracket in rocking engagement therewith, a king bolt extending through said head block and swingingly supported by its head from said head block, said king bolt connecting said head block to said axle bed and front axle.

8. A trailer comprising front and rear axles, a frame mounted on the rear axle, means for supporting the frame on the front axle, said means comprising an axle bed, a rearwardly extending bracket secured to the upper part of said axle bed and adapted to form a rocking seat, the forward part of the frame resting upon said bracket in rocking engagement therewith, and a king bolt positioned forwardly of said bracket and connecting said frame to the front axle.

9. A trailer comprising front and rear axles, a frame mounted on the rear axle and having a hollow head block provided with an aperture in its top and a lateral slot in its bottom, means for supporting the frame on the front axle, said means comprising an axle bed, a bracket on the upper part of said axle bed, the forward part of the frame resting upon said bracket in rocking engagement therewith, and a king bolt connecting the frame to the front axle, said king bolt extending through said aperture and slot in said head block and being swingingly supported by its head from said head block.

10. A trailer comprising front and rear axles, a frame mounted on the rear axle and having a hollow head block provided with an aperture in its top and a registering lateral slot in its bottom, means for supporting the frame on the front axle, comprising a transverse vertically-disposed axle bed on the front axle having its upper edge sloping from the central portion to either end of the axle, vertical journal bearings secured on the center line of said axle bed, a bracket secured to the upper end of said axle bed and adapted to form a rocking seat for the front part of the frame, a bearing block secured to the frame and having a curved undersurface adapted to rest upon said bracket in rocking engagement therewith, a king bolt extending through said aperture and slot in the head block and swingingly supported by its head from said head block, said king bolt also extending through said journal bearings, and means for connecting the lower end of the king bolt to the front axle.

11. A trailer comprising front and rear axles, a frame mounted thereon, a draft pole hingedly connected to the trailer body and adapted to be hingedly attached to the rear of a preceding vehicle, a reach rod, means for connecting said rod to the rearward portion of the frame and to the draft pole, a king bolt pivotally connecting the frame to the front axle, link connections between the king bolt and opposite ends of the rear axle, and link connections between each end of the front axle and the opposite side of the end of the preceding vehicle.

In testimony whereof I affix my signature.

ALEXANDER FEIGELSON.